United States Patent Office
3,486,090
Patented Dec. 23, 1969

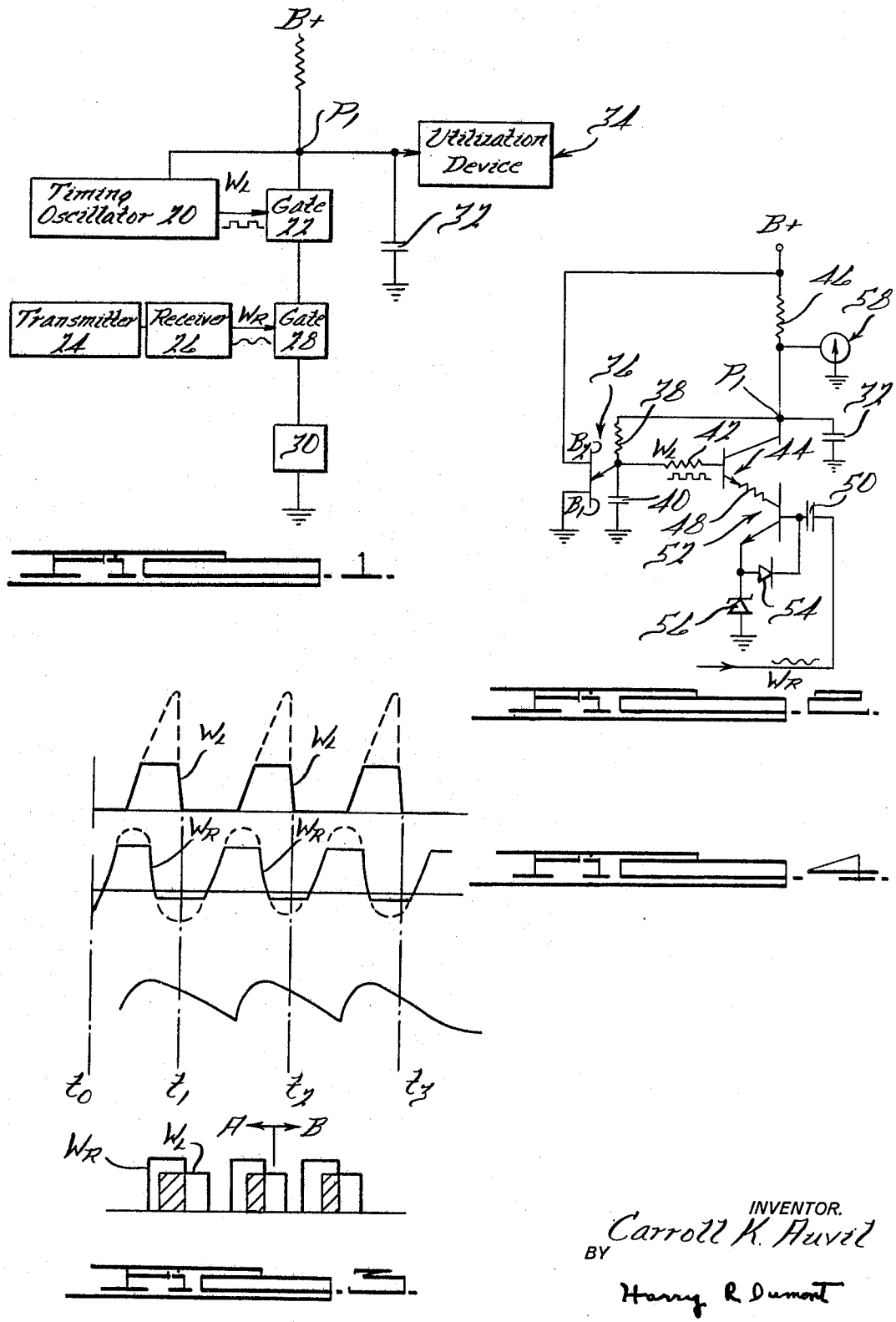

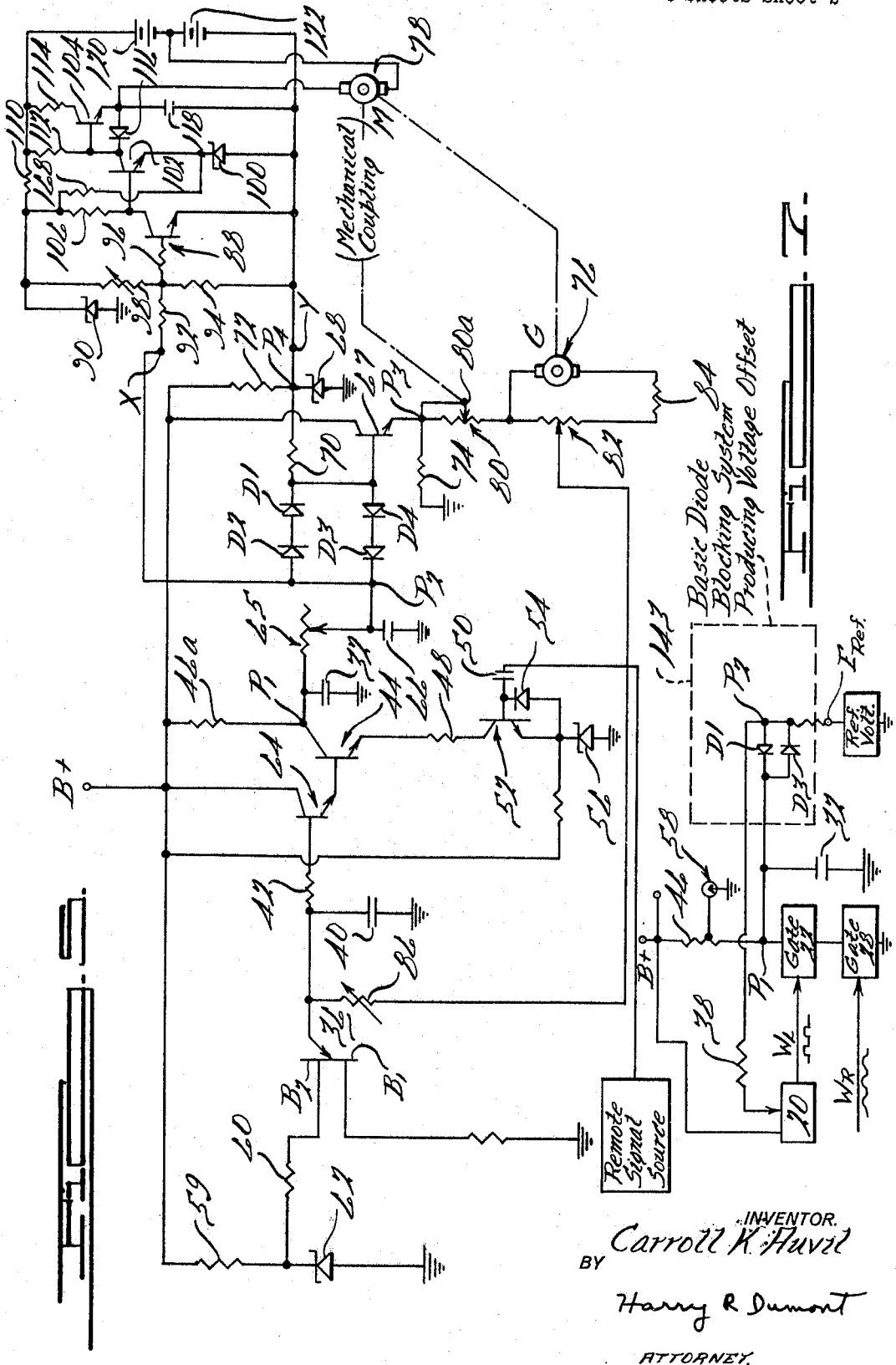

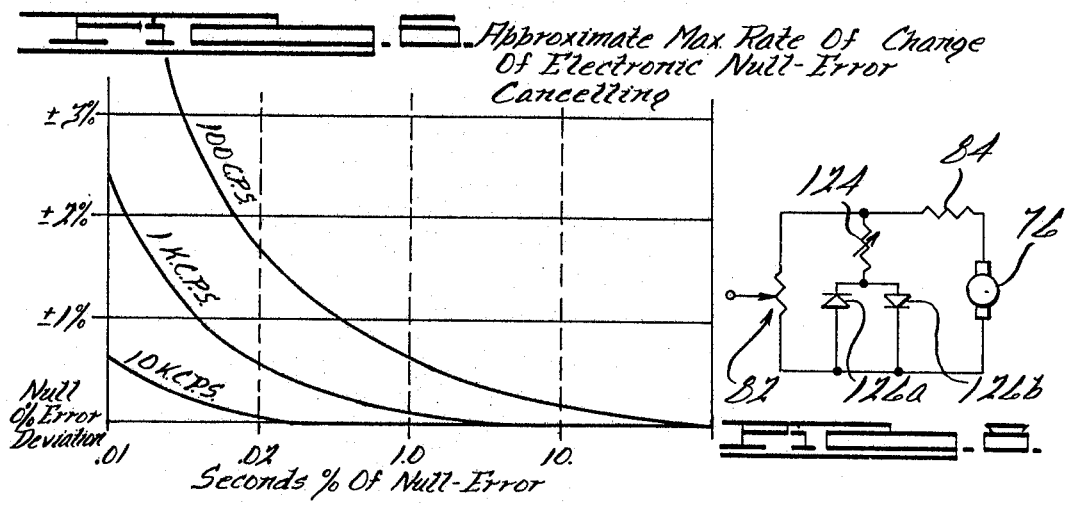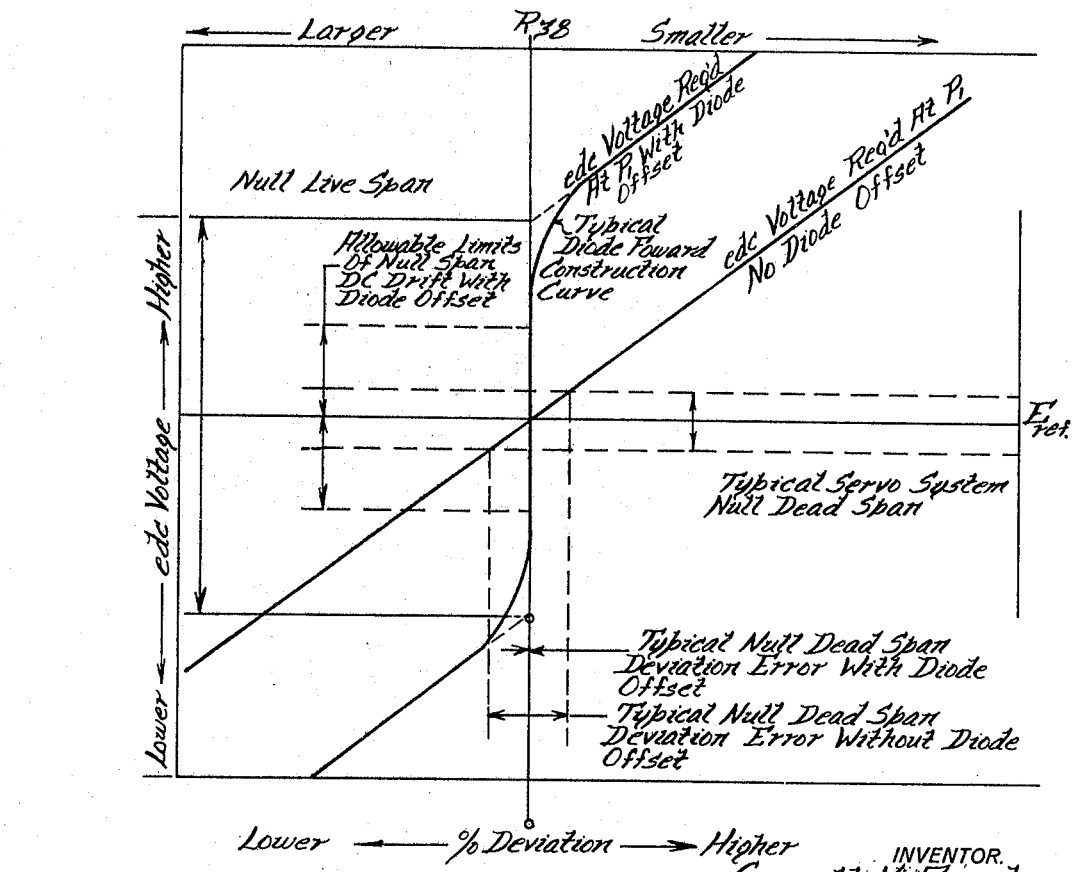

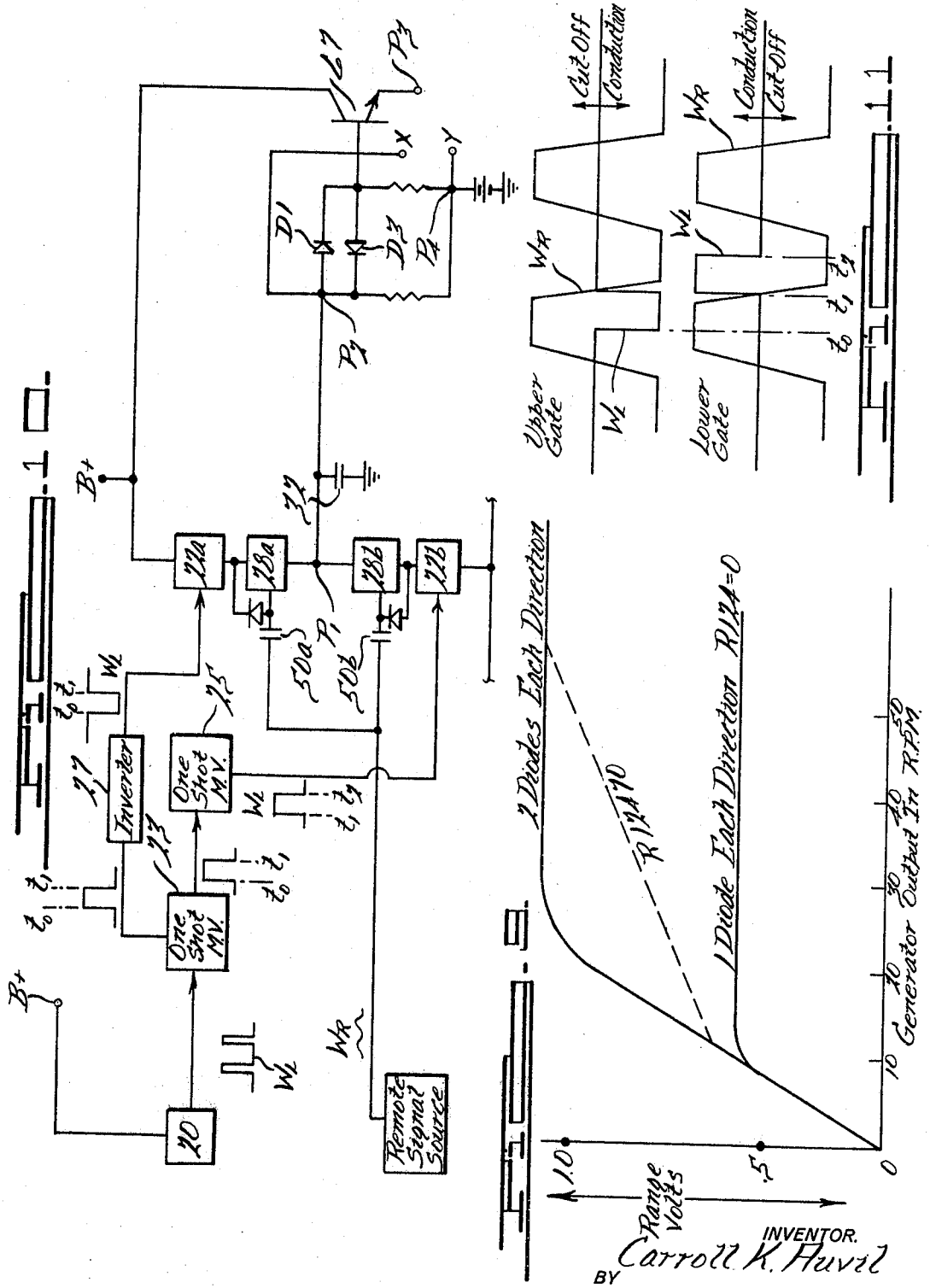

3,486,090
REMOTE CONTROL AND INDICATOR SYSTEM WITH CONTROL MAINTAINED THROUGH A REMOTE VARIABLE FREQUENCY SOURCE
Carroll K. Auvil, 129 W. Lafayette St., Romeo, Mich. 48065
Filed Apr. 27, 1966, Ser. No. 545,677
Int. Cl. H02p 1/54, 5/46
U.S. Cl. 318—18                                    13 Claims

ABSTRACT OF THE DISCLOSURE

A control circuit for a remote control system using a selectively variable frequency remote source. The circuit monitors the frequency differences between the remote source and a relatively fixed frequency local source and reacts to phase changes within discrete intervals on a cycle by cycle basis.

---

It is an object of this invention to provide an improved control circuit for a remote control system in which a remote or external control signal of selectively variable frequency is employed and in which the cycle to cycle phase relationship between that signal and a locally or internally generated relatively fixed frequency signal is employed to provide a control signal for the operation of a motive means.

It is a further object of this invention to provide an improved telemetering demodulator system of the remote indicator type in which the difference between the cycle to cycle phase relationships of a variable frequency external signal and a internal relatively fixed frequency signal are compared and in which an indication is provided which is a function of their difference.

An example of one remote control and indicator system in which my invention is particularly suitable for employment is shown and described in my U.S. Patent 2,684,472 issued on July 20, 1954 and entitled "Remote-Control Device."

Other features and advantages of the present invention will be best understood by reference to the following description, taken in connection with the drawings, in which I have shown several embodiments whereby my invention may be carried into effect.

In the drawings:

FIGURE 1 shows a combined diagrammatic and schematic representation of the invention;

FIGURE 2 is a detail schematic showing substantially similar to FIGURE 1;

FIGURES 3 and 4 are voltage waveform diagrams illustrative of the mode of operation of the invention;

FIGURE 5 is a schematic drawing of the present invention incorporated in a remote control system;

FIGURE 6 is a graph illustrating specified operational characteristics and advantages of the circuit of FIGURE 5;

FIGURE 7 is a detail schematic illustrating a modification of the circuit of FIGURE 2;

FIGURE 7a is graph explaining the operation of the circuit of FIGURE 7 and showing the importance of the diode blocking network employed therein;

FIGURE 8 shows an alternate embodiment of a portion of the circuit of FIGURE 5; while FIGURE 9 illustrates the mode of operation thereof;

FIGURE 10 illustrates in combined block diagrammatic and schematic form a still further embodiment of the present invention; and FIGURE 11 is a voltage waveform showing the mode of operation of the circuit of FIGURE 10.

With more particular reference to FIGURE 1, the basic elements of a system incorporating the present invention are shown. A timing oscillator 20 is employed to provide an internal reference signal $W_L$ of relatively fixed frequency. This signal is furnished to a gate 22. A remote transmitter is employed to provide an external control signal of selectively variable frequency $W_R$ which signal is normally received by a receiver 26 and provided as an input to gate 28. Gates 22 and 28 are operatively connected between a bias voltage source and a source of constant voltage 30. The control voltage output is used to discharge a capacitor 32 connected as shown. A utilization device 34 such as an ammeter is connected to receive the control output signal and to furnish an indication which is a function of the cycle to cycle phase relationship between the two input signals as in the system of FIGURE 2 or to provide a remote servo control system as illustrated in the system of FIGURE 5.

FIGURE 2 shows the detail of the timing oscillator 20 and the gating arrangement of FIGURE 1. A voltage controlled oscillator circuit including unijunction transistor 36 is connected as shown to a source of B+ potential and to a timing resistor 38 and timing capacitor 40. The oscillatory output $W_L$ is provided through isolating resistor 42 to the base of NPN transistor 444. The switching means employed in the present invention are illustrated as transistors but the invention is not so limited. By "switching means" I mean any electronic device having at least two principal or power conducting electrodes and a control electrode with the power conducted between the principal electrodes being controlled by a voltage signal received at the control electrode. Transistor 44 has its collector connected to the B+ source through load resistor 46 and further has its emitter connected in series with resistor 48. The input of remote control signal $W_R$ is furnished through coupling capacitor 50 to the base of NPN transistor 52. Diode 54 is connected across the emitter and base of transistor 52 with Zener diode 56 coupled as shown to provide a voltage reference and adjust the clipping level of the pulses. An indicator 58 shown as an ammeter is connected to provide a visual indication representative of the instantaneous cycle to cycle phase difference between signals $W_L$ and $W_R$.

FIGURE 3 shows the operation of the circuit of FIGURE 2 using idealized waveforms. It will be seen that if the frequency of the remote control signal $W_R$ increases slightly, it will move leftwardly or in an A direction. This will cause the shaded areas to decrease with a decrease in effective current through load resistor 46, thus causing the voltage at point $P_1$ to rise. This voltage rise will cause the timing oscillator frequency to increase so that $W_L$ will tend to assume the same frequency so $W_L$ will equal $W_R$. Because of the required higher voltage to maintain $W_L$ at its new frequency, the new phase positions of the two signals are not quite the same as before. It should be noted that the two signal frequencies have to be exactly matched in frequency to have a static output indication. No matter how slight the difference, the phasing to the two signals will, after an interval, produce an output of sufficient magnitude to cause the timing oscillator to correct the difference, however slight. The accuracy of the system will thus be seen to depend on only four parameters, namely:

(1) The physical stability of unijunction transistor 36.
(2) The stability of timing resistor 38.
(3) The voltage at base $B_1$ of unijunction transistor 36.
(4) The stability of timing capacitor 40.

It is important that the components which are involved with present day techniques can be employed in the circuit of FIGURE 2 to provide a timing system subject to no more than .001% error over a reasonable time period.

FIGURE 4 shows the actual voltage waveforms $W_L$ and $W_R$ as they are generated and employed in the system. The lower waveform shows the voltage of point $P_1$. For the telemetry demodulator of FIGURE 2, the amount of smoothing is not very critical. In connection with the servo system of FIGURE 5, the degree of smoothing becomes much more critical as will be explained hereinafter. Times, $t_0$, $t_1$, $t_2$, $t_3$ show the effective voltage output from the gates as reflected at point $P_1$. Otherwise stated, the voltage at $P_1$ is a function of how long the gates are open i.e. transistors 44, 52 are conducting during each cycle. Resistor 48 has been inserted in the circuit as shown to prevent too rapid discharge of capacitor 32.

FIGURE 5 shows a complete servo system employing a telemetry demodulator stage essentially similar to that of FIGURE 2. Resistors 59 and 60 are connected as shown with Zener diode 62 included to provide a stable voltage source. An additional transistor 64 is connected as an emitter follower between the output of unijunction transistor 36 and the gates. The output of the demodulator stage is provided to a servo adaptor stage which includes variable resistor 65 and capacitor 66 which provide ripple control over a limited range. An NPN transistor 67 is connected in an emitter follower configuration as shown. A blocking diode network including diodes $D_1$–$D_4$ is connected between point $P_2$ and Zener diode 68 to compare the reference voltage provided thereby to the voltage at point $P_2$. Fixed resistors 70, 72 and 74 are connected as shown.

The importance of this diode blocking network will be further explained in connection with FIGURES 7 and 7a, hereinafter. The motive means employed in the circuit includes a generator 76 and motor 78 connected as a motor generator set. A position potentiometer 80 is employed with a null position arm 80a mechanically coupled to servo motor 78 in a manner well known in the art. Servo motor 78 operates the position potentiometer 80 so that the servo null is maintained at substantially the same $P_3$ voltage. A second potentiometer 82 has its variable resistance connected in series with resistor 84 across generator 76 to provide a voltage signal representative of motor velocity. This voltage signal is fed back through resistor 86 to control the timing voltage of unijunction transistor 36 at its emitter.

A standard servo section is connected to provide for the operation of motor 78. Comprising this section are a servo input amplifier including transistor 88 and decoupling Zener diode 90. Fixed resistors 92, 96 and variable resistor 98 are coupled as shown with fixed bias furnished by Zener diode 100. Transistors 102 and 104 are operatively connected to and controlling the direction of rotation of motor 78 responsive to the conduction of one or the other. Bias resistors 106–114, diode 116, and capacitor 118 are connected to provide this mode of operation. Two like polarity DC supplies 120, 122 are included to provide drive voltage sources for transistors 104 and 102, respectively, across the armature winding of motor 78. The direction of rotation of motor 78 will thus be seen to be a function of the voltage output of the servo adaptor section. The operation of generator 76 is to provide a velocity voltage output which voltage is then used as a feedback to modify the control voltage to the timing oscillator including unijunction transistor 36 and thus control the frequency of $W_L$ signal.

FIGURE 6 illustrates a basic characteristic inherent in the servo system of FIGURE 5. It will be apparent that as the amount of error in the system is reduced, the error correction rate is correspondingly decreased. This rate of change can be altered i.e. increased by increasing the center frequency as is indicated by FIGURE 6 or by reducing the size of charge holding capacitor 32.

FIGURE 7 is a circuit substantially similar to that of FIGURE 2 except that a novel diode blocking network has been incorporated. This network comprises oppositely phased diodes $D_1$ and $D_3$ which are connected between the output at point $P_1$ and timing resistor 38. The function of this network is to provide a large increase in deviation sensitivity in the area of resistive null, without appreciable effect on the circuit operation. Point $P_1$ is isolated by the diode blocking network from $P_2$ by the amount of the diode forward conduction voltage. In the demodulator system of FIGURE 2, if there were a change in frequency of the remote signal $W_R$, however slight, voltage would shift upwardly or downwardly at $P_1$. Because of the diode isolation provided by the blocking network, there will be no immediate effect on $P_2$. Not until one of the diode $D_1$ or $D_3$ started conducting would then be sufficient current flow therethrough to affect the voltage at $P_2$. Otherwise stated, once a static condition of the system is established, the phase relationship remains fixed until there is appreciable change in the system. Since the diodes cause a relatively large voltage to be generated with a very slight frequency change, a relatively low gain servo system may be used in conjunction with the system as will be explained hereinafter.

FIGURE 7a is a graph which illustrates the function of the diode blocking network in the system of FIGURE 7 or, alternately, in the servo system of FIGURE 5 or 10. The term "null live span" is used in indicating the active area of the system in contrast to the null dead span as indicating an area of inactivity for the system. The extent of the "null live span" will be seen to the determined by the low voltage conduction characteristics of the diodes $D_1$, $D_3$ used in conjunction with the net resistive loading on the vco i.e. voltage controlled oscillator side of the diode network. The effect of the diode blocking network offset on the typical servo deadspan is also shown in the graph. The term "electronic deviation compensation" is abbreviated on the graph as "edc." It will further be seen from the graph that the $E_{ref}$ voltage can drift an appreciable amount without affecting the deviation error. The slope of the diode conduction curve within the null live span area can be modified by placing a resistance in parallel with the blocking diode network. This will also in effect, change the effective servo system dead span width. When the subsequent servo system input is connected across the diode blocking network as in FIGURE 5 or 10, additional advantages accrue as will further be explained in the section "Description of Operation."

FIGURE 8 shows an alternate form of the feedback generating portion of the circuit of FIGURE 5. This alternate form is of particular value when a servo system of low inertia, high response and maximum accuracy is required. In some systems, the maximum voltage provided by the voltage output may be too large, by a factor perhaps in excess of 10 or more. It is therefore desirable to reduce this to a reasonable feedback voltage regardless of generator output voltage. The sensitivity of the system to generator output voltage is reduced by connecting a series network including rheostat 124 and parallel connected, oppositely phased diodes 126a, 126b. In the circuit thus modified, the maximum feedback voltage is a function of the forward conducting voltage across the diodes. In germanium diodes, this is of the order of 0.2 volt and, in silicon diodes, 0.6 volt. Various combinations may be employed to give a voltage approximating what is desired in range. The adjustment of rheostat 124 permits extension of the range but at a reduced sensitivity.

FIGURE 9 shows the effect of several diode and resistance combinations on the operation of the system.

FIGURE 10 shows a system substantially similar to the servo system of FIGURE 5 with regard to the basic servo adaptor and standard servo sections. A pair of upper and lower gates 22a, 28a and 22b, 28b are employed with local $W_L$ pulses furnished by timing oscillator 20 and remote $W_R$ pulses provided as shown. Gates 22a, 28a, comprise series connected transistors of the PNP type. Gates 22b, 28b comprise series connected transistors of the NPN or oppositely phased type. The circuit of FIGURE 10 is somewhat less subject to error that that of FIGURE 5. When the frequencies of the $W_R$ and $W_L$ signals match, the phasing is such that neither the lower or upper set of gates is open. This condition is illustrated by the waveform diagrams of FIGURE 11. Suitable pulse waveforms are provided by the inclusion of one-shot multivibrators 23, 25 and inverter stage 27 in a manner well known in the art. At a null servo position, since the gates are closed, there is very small ripple in the system and capacitor 32 can be of smaller magnitude. With a smaller capacitance value for capacitor 32, for large signals, the upper gate at 22a, 28a will discharge it much more rapidly than was possible in the FIGURE 5 circuit. As the error gets progressively larger, the diode blocking is no longer important and ripple can increase without adverse effect on the system operation.

As illustrated in FIGURE 11, if the external signal $W_R$ frequency increases, the movement of that waveform to the left causes the upper gate set to open to provide a servo control output and to correct the internal timing frequency $W_L$. If the external signal $W_R$ frequency decreases, its waveform moves to the right and the lower set of gates 22b, 28b opens. In all cases, when one gate set opens the other gate set remains in a closed condition.

DESCRIPTION OF OPERATION

The present invention as embodied in a telemetry demodulator system is best exemplified by the circuit of FIGURE 2. It will be seen that when the internal signal $W_L$ and the external signal $W_R$ are applied to the bases of transistors 44 and 52, respectively, the voltage drop at point $P_1$ is a function of the instantaneous cycle to cycle phase difference between the two signals. Load resistor 46 is connected in the charge path of capacitor 32 and the voltage at point $P_1$ is a function of the rate of discharge of the capacitor through transistors 44 and 52. Current flow through ammeter 58 provides a visual indication of the instantaneous cycle to cycle phase difference between the two signals. The system of FIGURE 5 is substantially similar in operation to the system of FIGURE 2 except that the servo adaptor and standard servo stages are employed to provide a complete servo control system. The operation of the gates i.e. transistors 44 and 52 again is to provide a discharge path for capacitor 32 which is always tending to charge through resistor 46a. The capture range of the system is an important characteristic which must be given consideration. By "capture range" I mean that range of deviation over which the $W_L$ signal frequencies can be forced into synchronization with the $W_R$ signal frequency. In the system of FIGURE 5, the capture range is somewhat limited because the gates are cycle to cycle always in a state of partial operation. The servo mode of operation requires addition of a smoothing stage resistor 64 and relatively large capacitor 66 to reduce the ripple factor to a point where diodes such as $D_1$–$D_4$ can be employed. By comparison, the capture range of the circuit of FIGURE 10 is substantially broader. Only one set of gates, the upper or the lower, is operating i.e. conducting at one time. Since at a null position, neither set of gates is open, there is present only a small amount of ripple in the system and the magnitude of capacitor 32 used can be smaller than that required for the FIGURE 5 system. With a smaller magnitude for capacitor 32, for large error signals, the upper gate at 22a, 28a will charge it more rapidly or the lower gates discharge it more rapidly than was possible in the FIGURE 5 circuit. In either the FIGURE 5 or FIGURE 10 system, the capture range may be exceeded so long as remote signal $W_R$ cyclically changes away from null from within the capture range. The system of FIGURE 10 makes feasible a capture range of approximately plus or minus 20% of center frequency and makes it possible to reduce the number of diodes in the diode blocking network to only two diodes in parallel. Because of the lower ripple present, the diode effectiveness can be extended by a factor of the order of two thus allowing the use of a relatively low gain servo amplifier in the system.

An important feature of my invention as has been emphasized is the employment of the diode blocking network between the feedback controlling voltage and the voltage controlled oscillator. The diodes so employed in the several embodiments shown of my invention create, in effect, a limited range of localized isolation wherein the phase lock output must produce an output control voltage equal to the diode conduction voltage before the control linkage is reestablished. This, in effect, greatly increases the demodulation sensitivity of the system over this limited range. When the servo system input is further connected across the diode blocking network and the foregoing condition is made to coincide with the mechanical or true null of the system, several advantages result. The need for high gain servo amplifiers is eliminated. DC coupling is used throughout except for gate signal shaping flip-flops. The error contributing elements are localized and limited to those which control the timing oscillator frequency stability. System sensitivity to input signal waveform shape, size and form factor is very low. The system is sensitive only to frequency of input signal.

It will thus be seen that I have provided a novel and improved servo control and telemetry demodulator system suitable for a variety of uses and with a broad range of application.

I claim:

1. In a remote control system for controlling the operation of an electrically operated motive means wherein an external control signal source of variable frequency is employed, a control circuit comprising a timing oscillator operable to provide a relatively fixed frequency output, a pair of electronic switches coupled with their principal electrodes in series relationship, each of said electronic switches having a control electrode, one of said control electrodes coupled to said variable frequency output and the other of said control electrodes connected to said oscillator fixed frequency output to provide a control voltage output to said motive means, said control voltage output being a function of the instantaneous cycle to cycle phase difference between said control signal and said oscillator waveforms.

2. The combination as set forth in claim 1 in which said pair of electronic switches comprise transistors of like polarity, the emitter of one connected to the collector of the other through a resistor.

3. The combination as set forth in claim 1 in which said timing oscillator comprises a unijunction transistor biased for oscillatory operation.

4. The combination as set forth in claim 1 in which a feedback network is connected between said motive means and said oscillator to provide a feedback voltage for adjusting its frequency to match the frequency of said external signal source to compensate for phase deviations therebetween outside a predetermined range.

5. The combination as set forth in claim 4 in which said motive means comprises an electrical generator and motor, one operatively connected to the other.

6. The combination as set forth in claim 5 in which said feedback network includes a potentiometer connected across said generator and a variable resistor operatively connected between the movable contact of said potentiometer and said oscillator to provide a voltage feedback which is a function of the velocity of said motor.

7. In a telemetry demodulator system for indicating the difference between nominal frequency external voltage signal source and a relatively fixed frequency internal voltage signal source, a pair of electronic switches having their principal electrodes coupled in series relationship, each of said switches having a control electrode, one of said control electrodes connected to said nominal frequency voltage signal source and the other of said control electrodes connected to said fixed frequency voltage signal source to provide a voltage output signal which is a function of the instantaneous cycle to cycle phase relationship between said signals, and indicator means operatively connected to and controlled by said output signal for providing an indication which is a function of said relationship.

8. The combination as set forth in claim 7 in which said pair of electronic switches comprise transistors of like polarity, the emitter of one connected to the collector of the other through a resistor.

9. The combination as set forth in claim 7 in which said relatively fixed frequency signal source comprises a unijunction transistor biased for oscillatory operation.

10. In a remote control system for controlling the operation of electrically operated motive means including a variable frequency external voltage signal source and a relatively fixed frequency internal voltage signal source, a first pair of electronic switches, each having a control electrode and coupled with their principal electrodes in series relationship, said switches of like polarity, a second pair of electronic switches, each having a control electrode and coupled with their principal electrodes in series with each other and said principal electrodes of said first pair, said switches of said second pair of an opposite polarity to that of said first pair, a corresponding switch of each of said pairs having its control electrode operatively connected to said fixed frequency source to provide a combined control voltage output to said motive means which is a function of the instantaneous cycle to cycle phase difference between said variable and fixed frequency sources.

11. In a remote control sysem for controlling the operation of an electrically operated load device, an external control signal source of variable frequency output, a voltage controlled internal signal source of predetermined frequency, means for combining said signals to provide a combined output which is function of the instantaneous cycle to cycle phase relationship between said signals, means for integrating the resultant current of said combined output, and voltage feedback means operatively connected between said integrating means and said internal signal source for changing its frequency to match that of said external signal source.

12. In a remote control system for controlling the operation of an electrically operated load device, an external control signal source of variable frequency output, a voltage controlled internal signal source of predetermined frequency, means for combining said signals to provide a combined output which is a function of the instantaneous cycle to cycle phase relationship between said signals, means for integrating the resultant current of said combined output, a voltage feedback means operatively connected between said integrating means and said internal signal source for changing its frequency to match that of said external signal source, and a diode blocking network comprising a pair of parallel, oppositely phased diodes connected between said integrating means and said internal signal source.

13. The combination as set forth in claim 12 wherein said load device comprises an electrically operated motive means operatively connected across said diode blocking network.

References Cited

UNITED STATES PATENTS

| 2,588,743 | 3/1952 | McCallum | 318—28 |
| 2,946,004 | 7/1960 | Frank. | |
| 3,011,110 | 11/1961 | Yu-Chi Ho et al. | 318—162 XR |
| 3,034,028 | 5/1962 | Jamieson | 318—28 |
| 3,222,637 | 12/1965 | Gray | 318—28 XR |

B. DOBECK, Primary Examiner

U.S. Cl. X.R.

318—28; 324—82; 329—254